US008842120B2

(12) United States Patent
Tijssen

(10) Patent No.: US 8,842,120 B2
(45) Date of Patent: Sep. 23, 2014

(54) PHYSICS RULES BASED ANIMATION ENGINE

(75) Inventor: Remon Tijssen, Mill Valley, CA (US)

(73) Assignee: Adobe Systems Incorporated, San Jose, CA (US)

(\*) Notice: Subject to any disclaimer, the term of this patent is extended or adjusted under 35 U.S.C. 154(b) by 542 days.

(21) Appl. No.: 13/039,081

(22) Filed: Mar. 2, 2011

(65) Prior Publication Data
US 2013/0127878 A1 May 23, 2013

(51) Int. Cl.
*G06T 13/00* (2011.01)
*G06F 3/00* (2006.01)
*G06F 3/048* (2013.01)

(52) U.S. Cl.
CPC .............. *G06T 13/00* (2013.01); *G06T 2213/08* (2013.01); *G06T 2200/24* (2013.01)
USPC ............ 345/473; 715/748; 715/753; 715/769

(58) Field of Classification Search
CPC ................... A63F 2300/66; A63B 2071/0644; G06F 17/5009; G06F 3/0481; G06F 3/0484; G06F 3/04847; G06F 1/1626; G06T 2207/10016; G06T 13/80; G06T 7/0071; G05B 19/416; G05B 2219/36168
USPC ............................ 345/473; 715/748, 769, 753
See application file for complete search history.

(56) References Cited

U.S. PATENT DOCUMENTS

| 5,124,693 | A | 6/1992 | Himelstein et al. |
| 5,301,267 | A | 4/1994 | Hassett et al. |
| 5,499,366 | A | 3/1996 | Rosenberg et al. |
| 5,577,170 | A | 11/1996 | Karow |
| 5,684,510 | A | 11/1997 | Brassell et al. |
| 5,715,473 | A | 2/1998 | Reed |
| 5,771,042 | A | 6/1998 | Santos-Gomez |
| 5,872,566 | A | 2/1999 | Bates et al. |
| 5,930,408 | A | 7/1999 | Seto |
| 5,943,050 | A | 8/1999 | Bullock et al. |
| 5,956,736 | A | 9/1999 | Hanson et al. |
| 6,005,967 | A * | 12/1999 | Nakagawa et al. ........... 382/154 |
| RE36,704 | E | 5/2000 | Parker et al. |
| 6,377,240 | B1 | 4/2002 | Baudel et al. |
| 6,469,709 | B1 | 10/2002 | Sakai |
| 6,678,410 | B1 | 1/2004 | Phinney et al. |
| 6,828,971 | B2 * | 12/2004 | Uesaki et al. ................. 345/473 |
| 6,959,112 | B1 | 10/2005 | Wagman |
| 7,034,845 | B2 | 4/2006 | Perry et al. |

(Continued)

OTHER PUBLICATIONS

"Non-Final Office Action", U.S. Appl. No. 13/039,023, (Jul. 9, 2013), 19 pages.

(Continued)

*Primary Examiner* — Kee M Tung
*Assistant Examiner* — Haixa Du
(74) *Attorney, Agent, or Firm* — Wolfe-SBMC

(57) ABSTRACT

At an animation authoring component, an inputted movement of an object displayed in a graphical user interface is received. Further, at a physics animation rule engine, a physics generated movement of the object that results from a set of physics animation rules is applied to the inputted movement. In addition, at the graphical user interface, the inputted movement of the object is displayed in addition to the physics generated movement of the object. At the animation authoring component, the physics generated movement of the object in addition to the inputted movement of the object is recorded.

20 Claims, 9 Drawing Sheets

(56) References Cited

U.S. PATENT DOCUMENTS

| | | | |
|---|---|---|---|
| 7,058,903 B1 | 6/2006 | Jonach et al. |
| 7,136,067 B2 | 11/2006 | Stamm et al. |
| 7,222,306 B2 | 5/2007 | Kaasila et al. |
| 7,236,174 B2 | 6/2007 | Stamm et al. |
| 7,292,249 B2 | 11/2007 | Stamm et al. |
| 7,437,683 B1 | 10/2008 | Beezer et al. |
| 7,583,267 B2 | 9/2009 | Stamm et al. |
| 7,594,174 B2 | 9/2009 | Truelove et al. |
| 7,684,619 B2 | 3/2010 | Sprang et al. |
| 7,769,819 B2 | 8/2010 | Lerman et al. |
| 8,223,165 B1 | 7/2012 | Jitkoff et al. |
| 8,269,736 B2 | 9/2012 | Wilairat |
| 8,386,956 B2 | 2/2013 | Ording et al. |
| 8,416,243 B2 | 4/2013 | Plummer |
| 8,471,856 B2 | 6/2013 | Stamm et al. |
| 2002/0051007 A1 | 5/2002 | Kitagawa et al. |
| 2002/0085018 A1 | 7/2002 | Chien |
| 2003/0038797 A1 | 2/2003 | Vazzana |
| 2004/0066393 A1 | 4/2004 | Cragun |
| 2004/0177323 A1 | 9/2004 | Kaasila et al. |
| 2004/0183817 A1 | 9/2004 | Kaasila |
| 2005/0012755 A1 | 1/2005 | Dresevic et al. |
| 2005/0062758 A1 | 3/2005 | Kaasila et al. |
| 2005/0162430 A1 | 7/2005 | Stamm et al. |
| 2005/0168476 A1 | 8/2005 | Levene et al. |
| 2005/0188309 A1 | 8/2005 | Tasker et al. |
| 2005/0190187 A1 | 9/2005 | Salesin et al. |
| 2005/0237342 A1 | 10/2005 | Stamm et al. |
| 2006/0017733 A1 | 1/2006 | Matskewich et al. |
| 2006/0022956 A1 | 2/2006 | Lengeling |
| 2006/0114258 A1 | 6/2006 | Stamm et al. |
| 2007/0070071 A1 | 3/2007 | Terazono et al. |
| 2007/0097128 A1 | 5/2007 | Lim |
| 2007/0106929 A1 | 5/2007 | Foster et al. |
| 2007/0139413 A1 | 6/2007 | Stamm et al. |
| 2007/0139415 A1 | 6/2007 | Stamm et al. |
| 2007/0157097 A1 | 7/2007 | Peters |
| 2007/0188497 A1 | 8/2007 | Dowling et al. |
| 2007/0189708 A1 | 8/2007 | Lerman et al. |
| 2007/0216689 A1 | 9/2007 | Stamm et al. |
| 2007/0240057 A1 | 10/2007 | Satterfield et al. |
| 2007/0266319 A1 | 11/2007 | Matsuo |
| 2007/0266335 A1 | 11/2007 | Zielinski et al. |
| 2007/0268273 A1 | 11/2007 | Westerman et al. |
| 2007/0273668 A1 | 11/2007 | Park et al. |
| 2008/0012862 A1 | 1/2008 | Duggan et al. |
| 2008/0034317 A1 | 2/2008 | Fard et al. |
| 2008/0097621 A1 | 4/2008 | Tasker et al. |
| 2008/0165193 A1 | 7/2008 | Stamm et al. |
| 2008/0229238 A1 | 9/2008 | Young |
| 2008/0238922 A1 | 10/2008 | Rhodes et al. |
| 2008/0294974 A1 | 11/2008 | Nurmi et al. |
| 2009/0184980 A1 | 7/2009 | Mansfield |
| 2009/0288043 A1 | 11/2009 | Willis |
| 2009/0295826 A1 | 12/2009 | Good et al. |
| 2009/0303178 A1 | 12/2009 | Koda et al. |
| 2010/0056221 A1 | 3/2010 | Park |
| 2010/0058228 A1 | 3/2010 | Park |
| 2010/0088632 A1 | 4/2010 | Knowles et al. |
| 2010/0162151 A1 | 6/2010 | Class et al. |
| 2010/0214257 A1 | 8/2010 | Wussler et al. |
| 2010/0271404 A1 | 10/2010 | Marr |
| 2010/0278504 A1 | 11/2010 | Lyons et al. |
| 2010/0313154 A1 | 12/2010 | Choi et al. |
| 2010/0318908 A1 | 12/2010 | Neuman et al. |
| 2011/0025719 A1 | 2/2011 | Yanase |
| 2011/0069085 A1 | 3/2011 | Weber et al. |
| 2011/0072344 A1 | 3/2011 | Harris et al. |
| 2011/0116769 A1 | 5/2011 | Sugiyama et al. |
| 2011/0167349 A1 | 7/2011 | Samra et al. |
| 2011/0181521 A1 | 7/2011 | Reid et al. |
| 2011/0197124 A1 | 8/2011 | Garaventa |
| 2011/0197153 A1* | 8/2011 | King et al. .................... 715/769 |
| 2011/0246916 A1 | 10/2011 | Leskelä et al. |
| 2011/0302532 A1 | 12/2011 | Missig |
| 2011/0314424 A1 | 12/2011 | Gusmorino et al. |
| 2012/0017153 A1 | 1/2012 | Matsuda et al. |
| 2012/0017163 A1 | 1/2012 | Ragan |
| 2012/0042272 A1 | 2/2012 | Hong et al. |
| 2012/0092340 A1 | 4/2012 | Sarnoff et al. |
| 2012/0110438 A1 | 5/2012 | Peraza et al. |
| 2012/0198330 A1 | 8/2012 | Koppel et al. |
| 2012/0210222 A1 | 8/2012 | Matsuda et al. |
| 2012/0313865 A1 | 12/2012 | Pearce |
| 2013/0097502 A1 | 4/2013 | Langmacher et al. |
| 2013/0127867 A1 | 5/2013 | Tijssen et al. |
| 2013/0127910 A1 | 5/2013 | Tijssen et al. |
| 2013/0132878 A1 | 5/2013 | Tijssen |
| 2013/0132888 A1 | 5/2013 | Tijssen |
| 2013/0132907 A1 | 5/2013 | Kukulski et al. |
| 2013/0145268 A1 | 6/2013 | Kukulski |
| 2013/0145270 A1 | 6/2013 | Piran et al. |

OTHER PUBLICATIONS

"Non-Final Office Action", U.S. Appl. No. 13/309,924, (Mar. 1, 2013), 19 pages.

"Non-Final Office Action", U.S. Appl. No. 13/225,203, (Apr. 12, 2013), 12 pages.

"Final Office Action", U.S. Appl. No. 13/225,203, (Aug. 29, 2013),10 pages.

"Non-Final Office Action", U.S. Appl. No. 12/893,669, (Sep. 12, 2013),14 pages.

"Canvas Tips and Techniques: Creating a Presentation in Canvas", available at <http://www.adeptscience.co.uk/products/dataanal/canvas/tutorials/presentation.pdf>, (2002), 9 pages.

"Surface by Microsoft, Pre-Order the New Windows Tablet", retrieved from <http://www.microsoft.com/surface/en-US> on Oct. 17, 2012, 5 pages.

"The Photo Finishes Corel Draw X4 Suite", retrieved from <http://thephotofinishes.com/coreldx4.htm> on Oct. 11, 2010, 8 pages.

Bain, Steve "Cool Tricks with Paragraph Text in CorelDRAW", retrieved from <http://mc.corel.com/servlet/Satellite?c=Content_C1&cid=1158342655543&lc=en&pagename=CorelCom%2FLayout> on Jun. 18, 2010, (2010), 8 pages.

"Final Office Action", U.S. Appl. No. 13/309,924, Sep. 25, 2013, 17 pages.

"Final Office Action", U.S. Appl. No. 13/039,023, Oct. 11, 2013, 22 pages.

"Fontlab Fontographer 5", Fontlab, Ltd., Jun. 2010, 525 pages.

"Non-Final Office Action", U.S. Appl. No. 13/339,367, Dec. 26, 2013, 21 pages.

"Non-Final Office Action", U.S. Appl. No. 12/901,799, Sep. 16, 2013, 22 pages.

"Adobe PostScript", Available at <http://www.signwarehouse.com/tech-support/manuals/Laser%20Master.pdf>, 2006, 181 pages.

"Final Office Action", U.S. Appl. No. 12/901,799, Feb. 7, 2014, 23 pages.

"Non-Final Office Action", U.S. Appl. No. 12/893,669, Apr. 21, 2014, 15 pages.

"Non-Final Office Action", U.S. Appl. No. 13/038,871, Mar. 18, 2014, 14 pages.

"Non-Final Office Action", U.S. Appl. No. 13/039,023, Jan. 31, 2014, 33 pages.

"Non-Final Office Action", U.S. Appl. No. 13/225,203, Mar. 20, 2014, 12 pages.

"TrueType 1.0 Font Files", Technical Specification, Revision 1.66, Aug. 1995, 408 pages.

"Non-Final Office Action", U.S. Appl. No. 13/309,924, Jul. 3, 2014, 14 pages.

"Final Office Action", U.S. Appl. No. 13/339,367, Jul. 3, 2014, 19 pages.

"Final Office Action", U.S. Appl. No. 13/039,023, Jul. 3, 2014, 43 pages.

"Final Office Action", U.S. Appl. No. 13/038,871, Aug. 6, 2014, 14 pages.

* cited by examiner

PHYSICS RULES BASED ANIMATION ENGINE

BACKGROUND

1. Field

This disclosure generally relates to computer graphics. More particularly, the disclosure relates to animation in computer graphics.

2. General Background

Conventional animation involves utilizing key frames to provide an indication of how an object should be animated. For each individual movement between key frames, equations are typically programmed to generate conventional animation.

Accordingly, to create natural human motions, conventional animation involves numerous and often complex equations in between key frames as a typical conventional computer animation involves many key frames. Programming such equations for so many key frames is often too burdensome and complex to provide practical conventional animation with natural human motions.

SUMMARY

In one aspect of the disclosure, a computer program product is provided. The computer program product includes a computer useable medium having a computer readable program. The computer readable program when executed on a computer causes the computer to receive, at an animation authoring component, an inputted movement of an object displayed in a graphical user interface. Further, the computer readable program when executed on the computer causes the computer to determine, at a physics animation rule engine, a physics generated movement of the object that results from a set of physics animation rules being applied to the inputted movement. In addition, the computer readable program when executed on the computer causes the computer to display, at the graphical user interface, the physics generated movement of the object in addition to the inputted movement of the object. The computer readable program when executed on the computer also causes the computer to record, at the animation authoring component, the physics generated movement of the object in addition to the inputted movement of the object.

In another aspect of the disclosure, a process is provided. The process receives, at an animation authoring component, an inputted movement of an object displayed in a graphical user interface. Further, the process determines, at a physics animation rule engine, a physics generated movement of the object that results from a set of physics animation rules being applied to the inputted movement. In addition, the process displays, at the graphical user interface, the physics generated movement of the object in addition to the inputted movement of the object. The process also records, at the animation authoring component, the physics generated movement of the object in addition to the inputted movement of the object.

In yet another aspect of the disclosure, a system is provided. The system includes an animation authoring component that receives an inputted movement of an object and records the inputted movement of the object in addition to a physics generated movement of the object. Further, the system includes a physics animation rule engine that determines the physics generated movement of the object that results from the set of physics animation rules being applied to the inputted movement. In addition, the system includes a graphical user interface that displays the physics generated movement of the object in addition to the inputted movement of the object.

DRAWINGS

The above-mentioned features of the present disclosure will become more apparent with reference to the following description taken in conjunction with the accompanying drawings wherein like reference numerals denote like elements and in which.

Figure 4A:
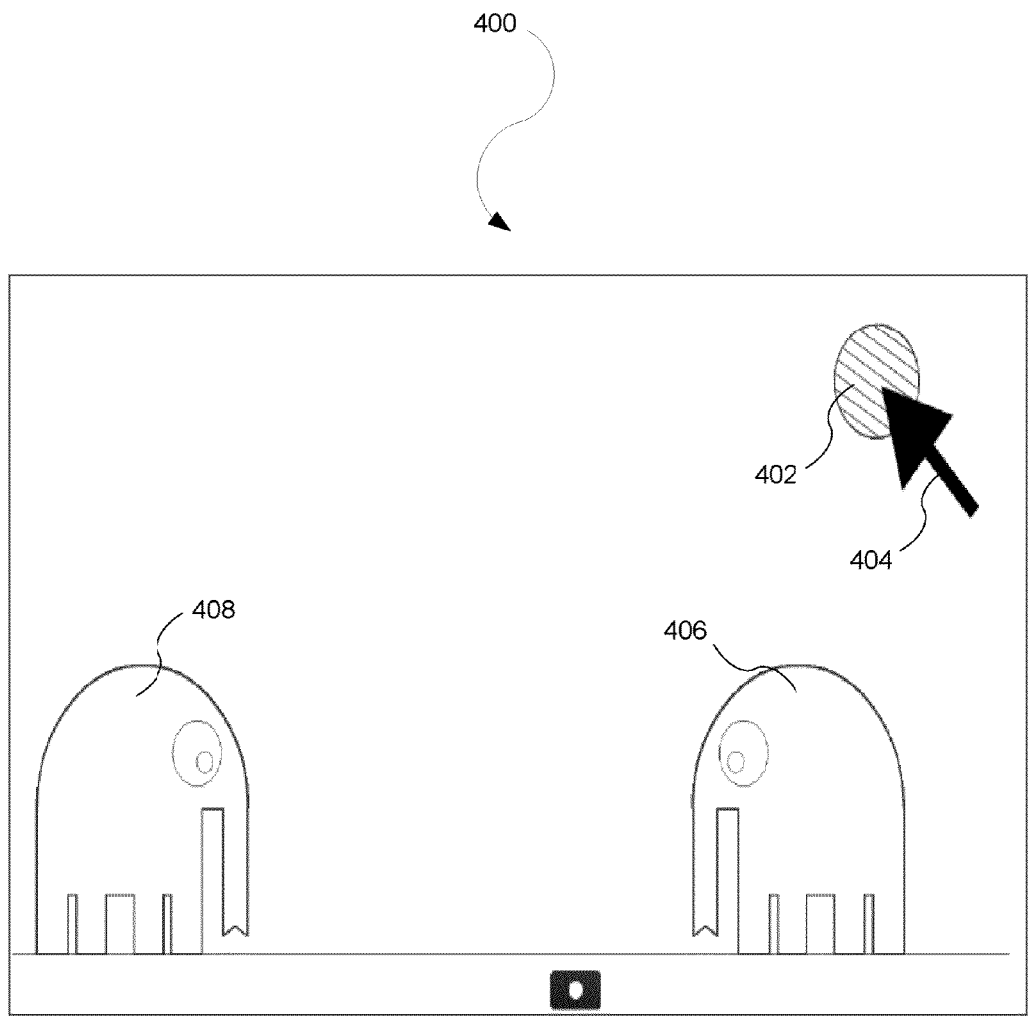
FIGS. 4A-4D illustrates an example of a graphical user interface ("GUI") with physics animation of various objects.

For example, FIG. 4A illustrates the GUI with a ball, a pointer, a first elephant, and a second elephant.

Figure 4B:
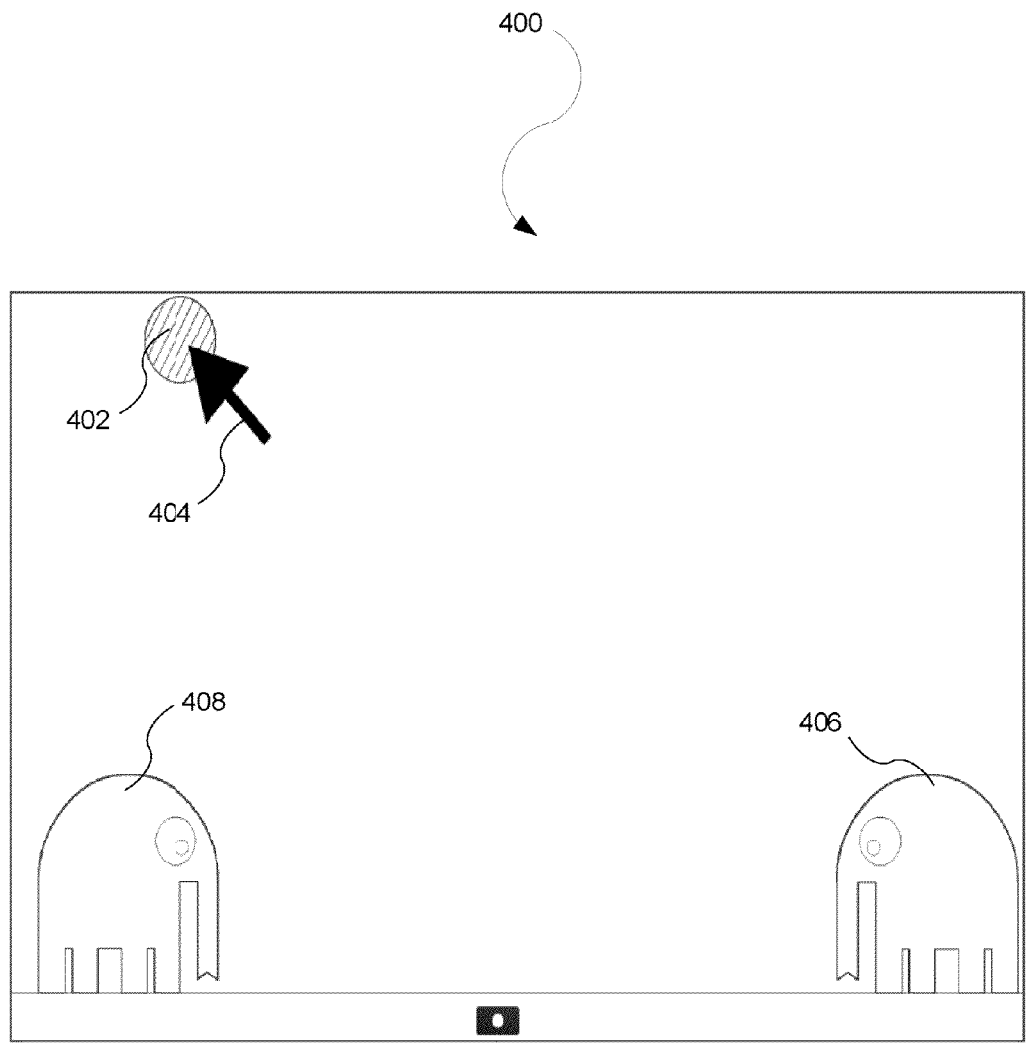

Further, FIG. 4B illustrates an example of the pointer moving the ball from the right side of the GUI to the left side of the GUI.

Figure 4C:
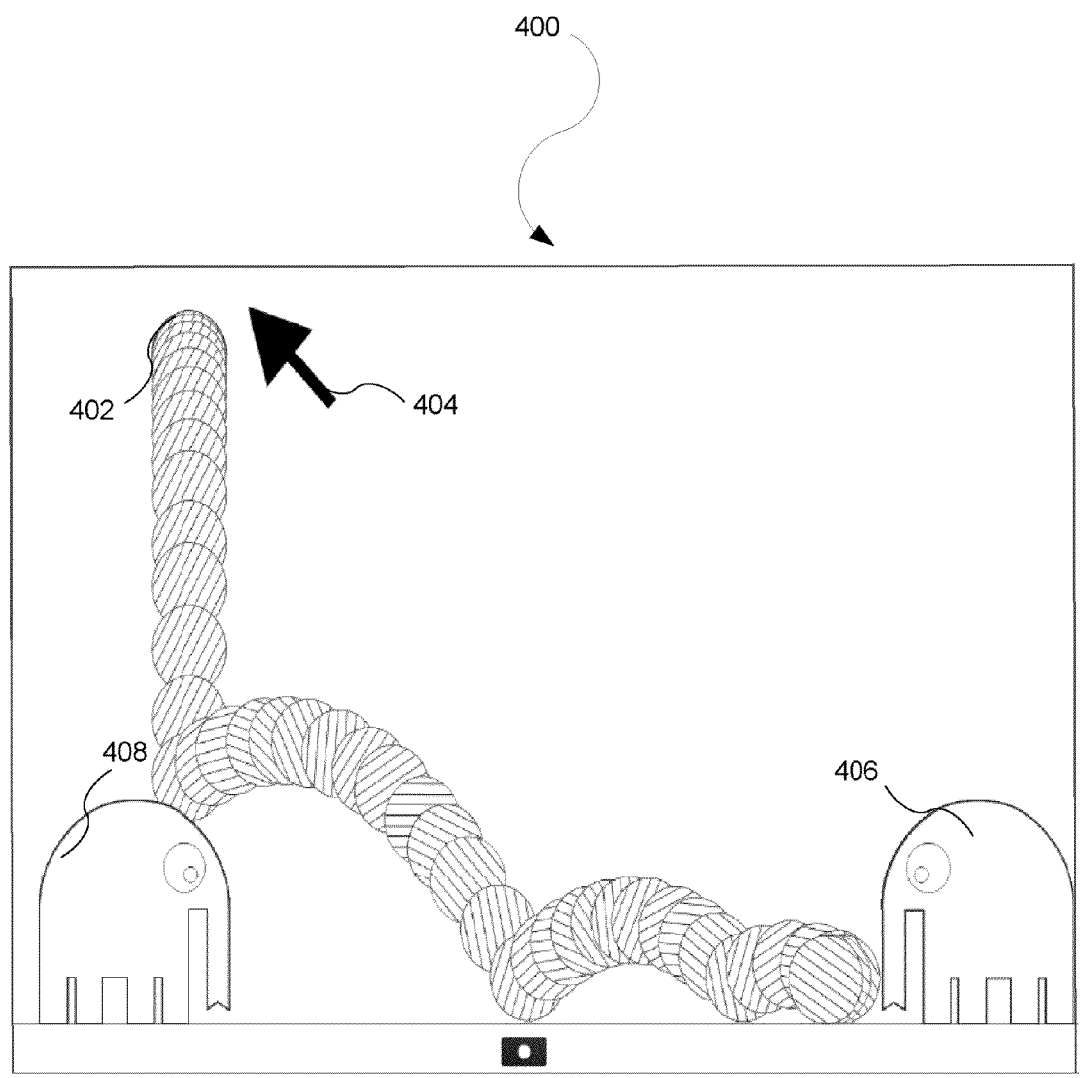

In addition, FIG. 4C illustrates an example of the pointer illustrated in FIG. 4B releasing the ball.

Figure 4D:
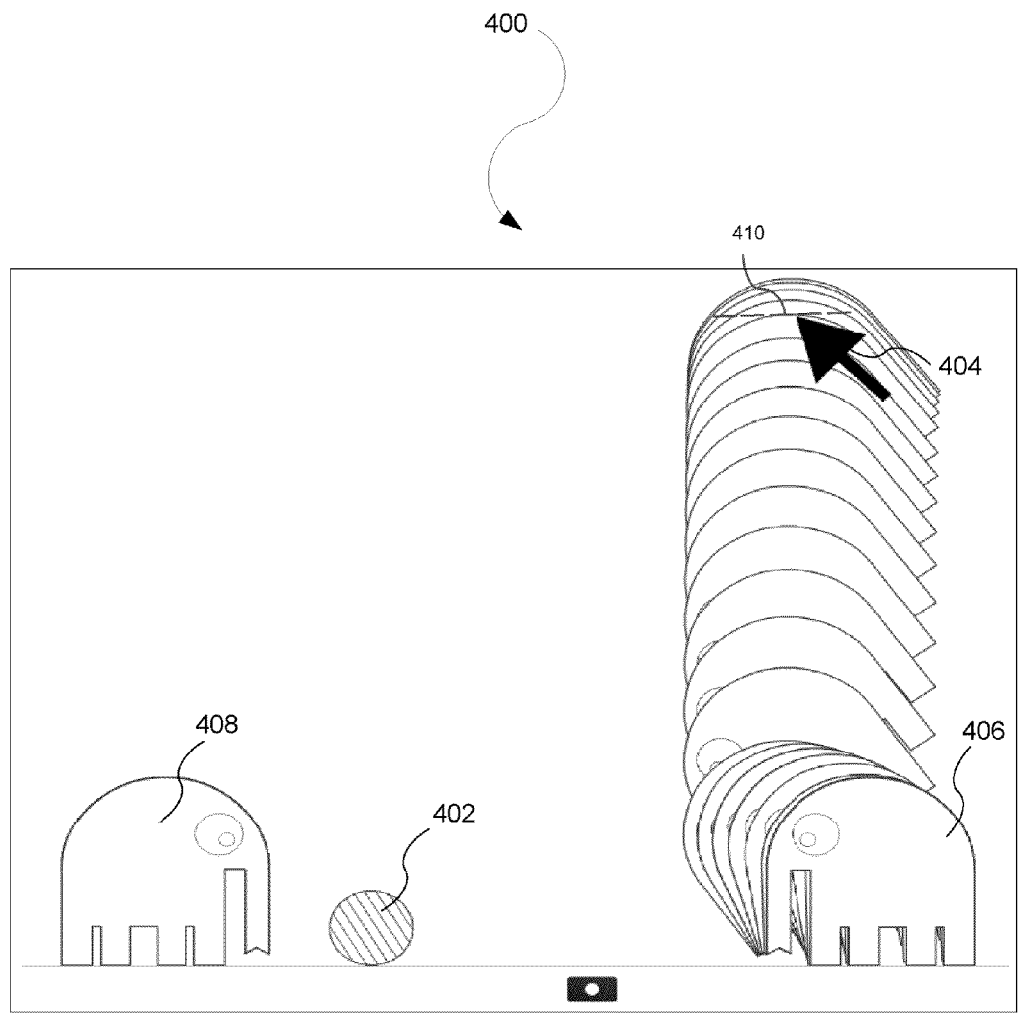

FIG. 4D illustrates an example in which the pointer picks up the first elephant.

Figure 5:
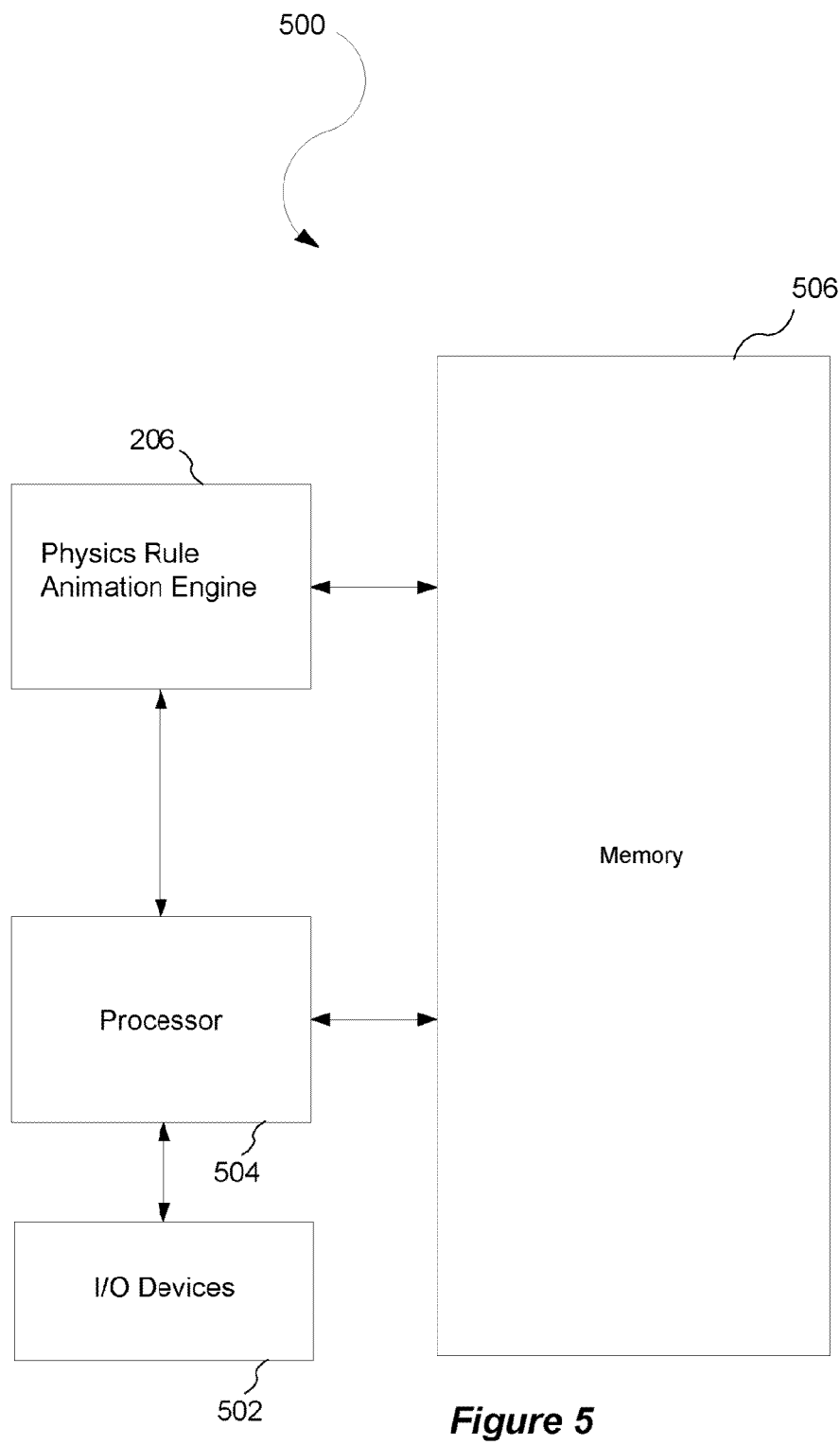

FIG. 5 illustrates a system configuration that may be utilized physics rule animation.

Figure 6:
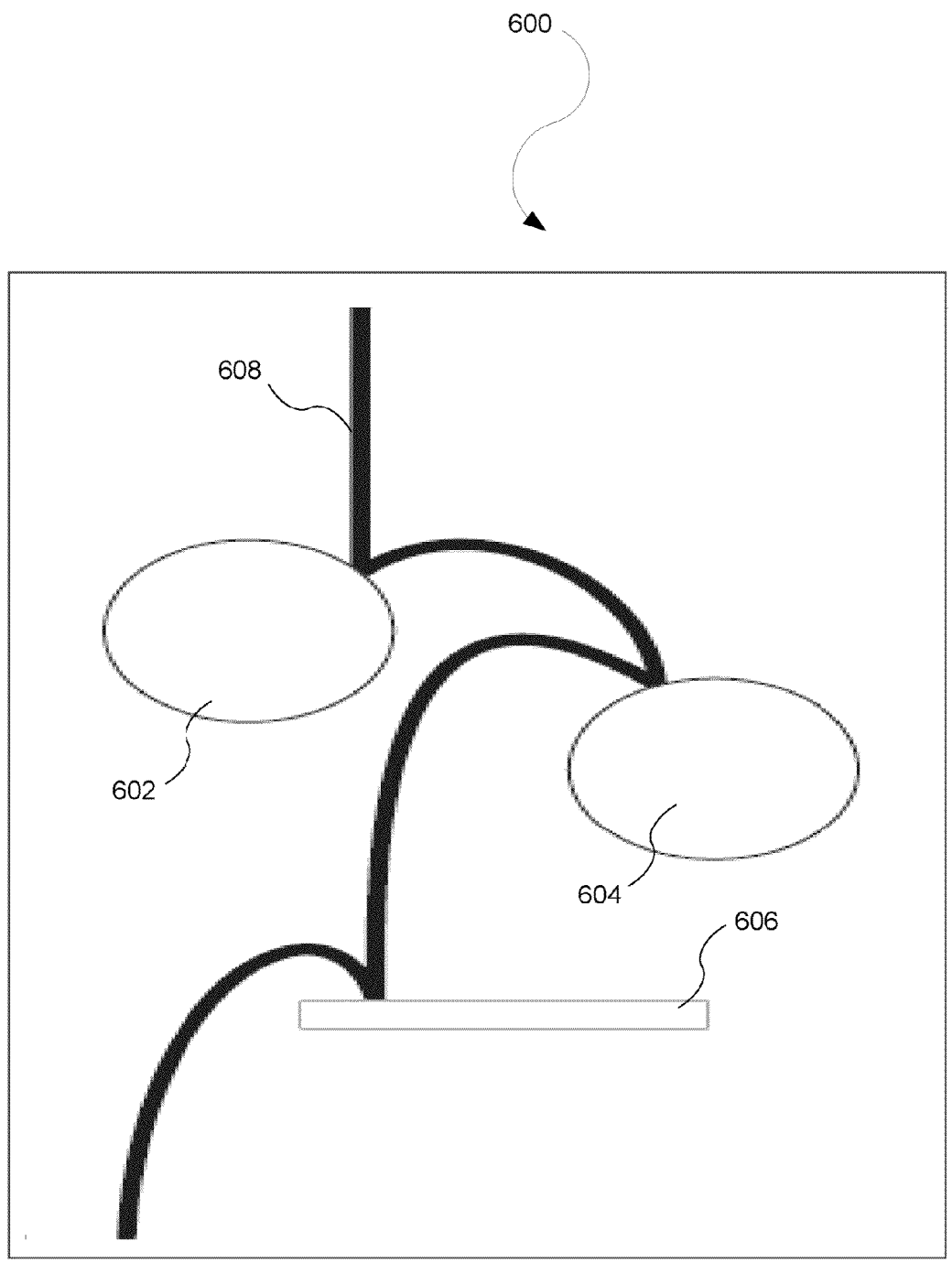

FIG. 6 illustrates a pinball physics configuration in a GUI.

DETAILED DESCRIPTION

A physics rules animation method, system, and computer program product are provided to allow a user to create an animation. The animation reflects natural real life motions as defined by a set of physics rules in physics animation rules engine. In other words, a user may input a movement for an object in a GUI and an additional movement may result based on the set of physics rules. For example, if a user utilizing an animation authoring component picks up a soccer ball from the ground displayed in the GUI and lets go of the soccer ball in the air, the physics engine will cause the soccer ball to fall to the ground and bounce to reflect gravity. In contrast, a conventional animation system would typically just leave the soccer ball in the air unless the author also inputted numerous and complex equations that mapped the specific movements of the ball.

The configurations provided for herein allow a user to create animations in a more intuitive manner. For example, by utilizing an input device, a user may move a character around a screen. Animation may then be created from the user's movement of the character and the user's interaction with objects in the screen. Further, those interactions are realistic interactions resulting from the set of physics rules. A user can expect to see a similar interaction between a character and an object to that of a real world interaction. In addition, in one embodiment, the visual feedback is performed in real-time. As a result, the real world perception of the animation is further enhanced.

Figure 1:
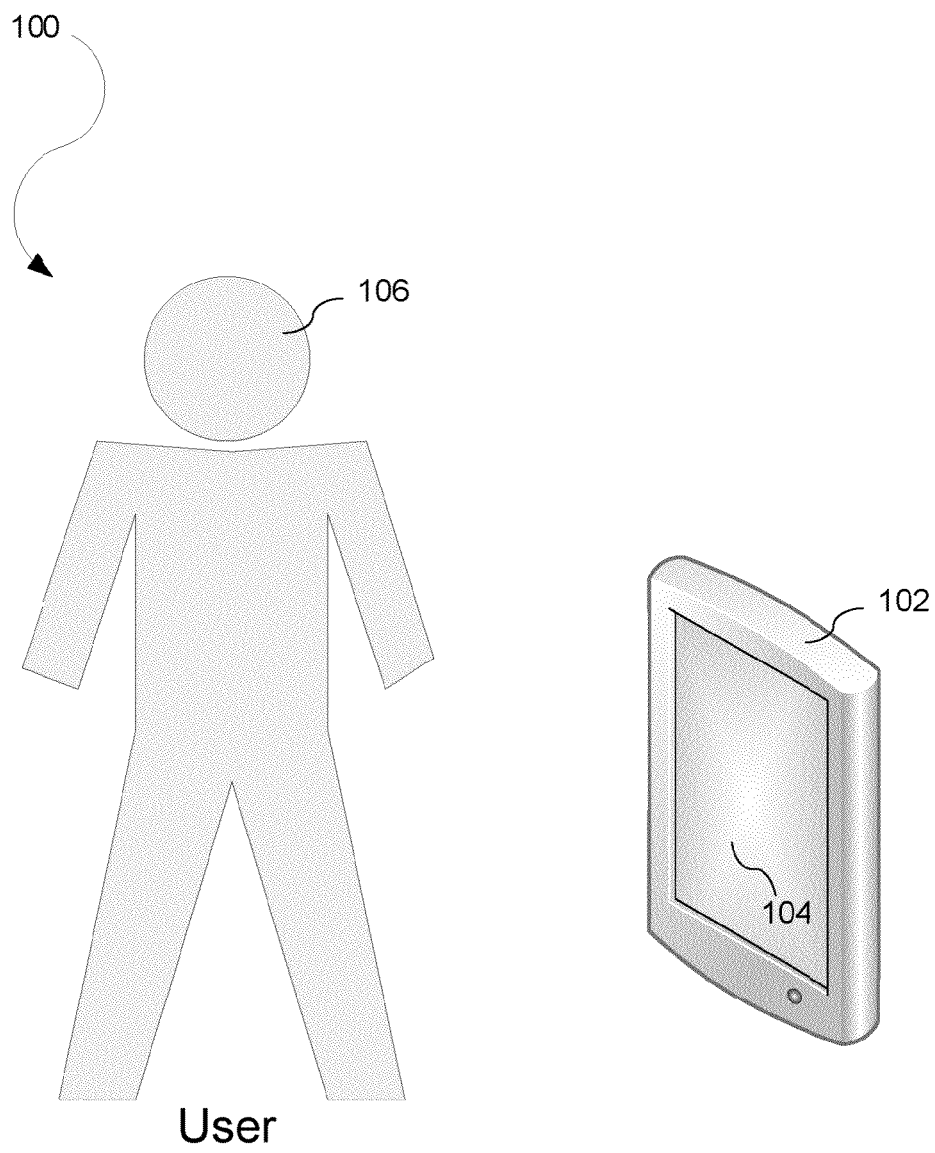
FIG. 1 illustrates a computing environment that may be utilized for animation with the physics rules animation engine.

FIG. 1 illustrates a computing environment 100 that may be utilized for animation with the physics rules animation engine. The computing device 102 may be any device with a processor such as a computer tablet, personal computer, laptop, notebook, cell phone, smart phone, personal digital assistant, personal medial player, set top box, etc. The computing device 102 is illustrated as a tablet only for illustrative purposes.

Figure 2:
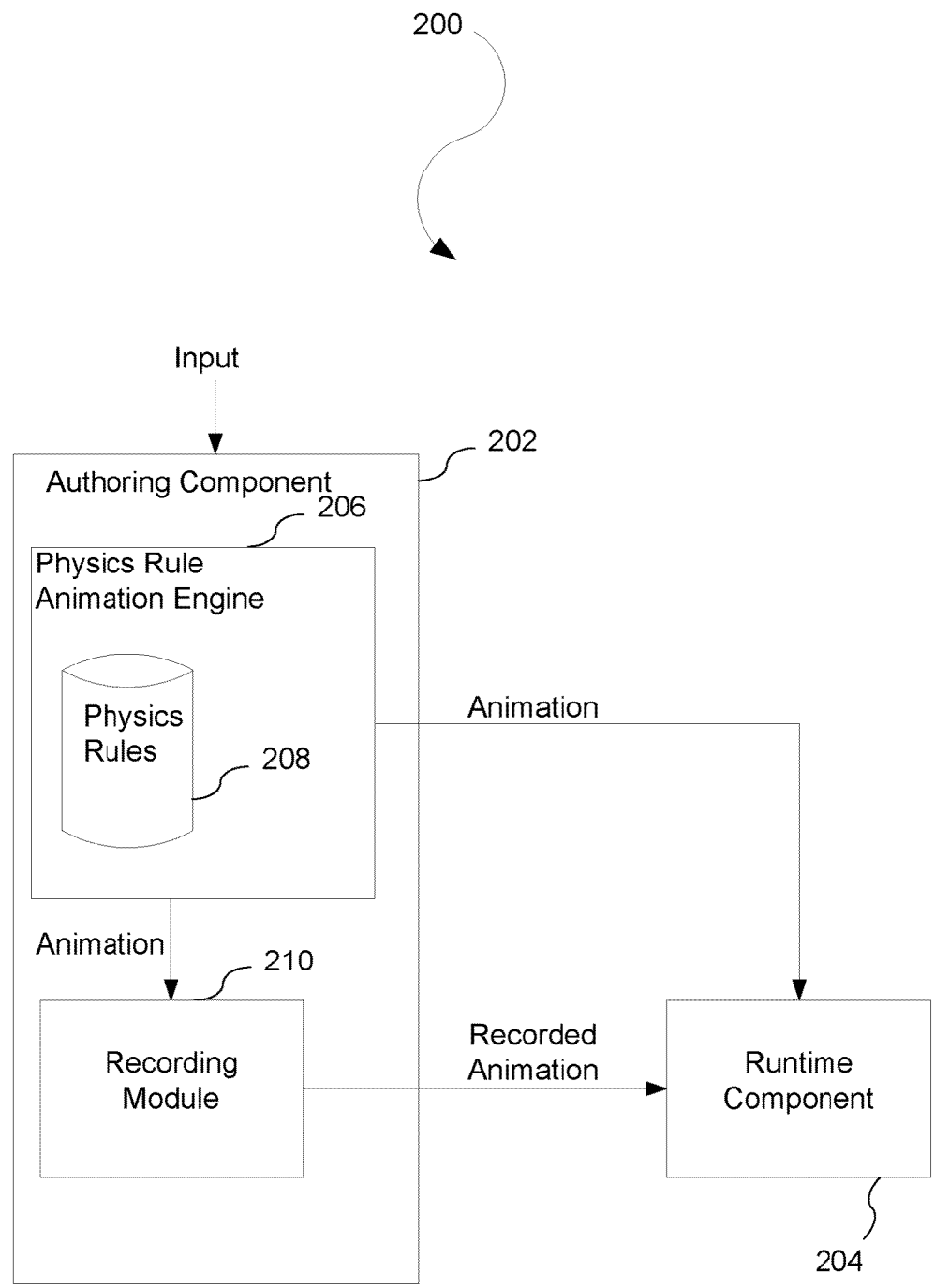
FIG. 2 illustrates a physics rules animation system that includes an authoring component and a runtime component.

FIG. 2 illustrates a physics rules animation system 200 that includes an authoring component 202 and a runtime component 204. An author may utilize to the authoring component 202 to create and/or edit an animation. Accordingly, the authoring component 206 receives an input. The input may be received through a computing device 102 as illustrated in FIG. 1. In one embodiment, the input is an action performed on an object. Examples include picking up a ball, pushing a ball, swinging a ball, etc. Further, the authoring component 206 has a physics rule animation engine 206 that applies one or more of a set of physics rules 208 to the inputted movement. The set of physics rules 208 may include gravitational force, centripetal force, centrifugal force, inertial force, or any other physics rule reflects natural motion. For example, if the inputted movement is a push and release of the ball, the physics rules animation engine 208 applies the physics rule of inertial force to the ball so that the ball moves and continues to move even after the user releases the ball. After the user has created and/or edited the animation, the animation may then be sent to the runtime component 204 for utilization during runtime of the animation. The user may alternatively or additionally send the animation to the recording module 210 to be recorded. The recorded animation may then be sent to the runtime component 204 for playback.

Figure 3:
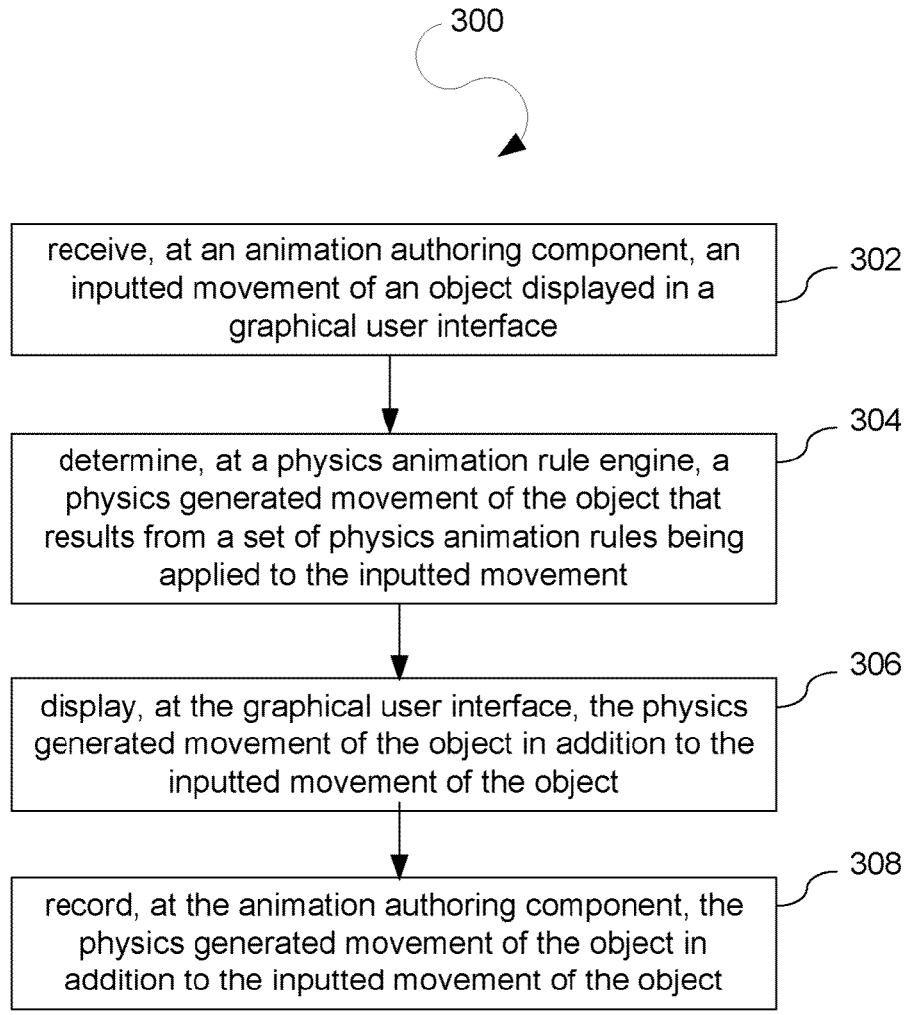
FIG. 3 illustrates a process that may be utilized to provide physics rule animation.

FIG. 3 illustrates a process 300 that may be utilized to provide physics rule animation. At a process block 302, the process 300 receives, at an animation authoring component, an inputted movement of an object displayed in a graphical user interface. The inputted movement may be received from a variety of input devices. A user may utilize a computer mouse to select and move characters and/or objects. Alternatively, a user may utilize a multi-touch enabled device to select and move characters and/or objects with touch inputs. In yet another alternative, a user may utilize a joystick to provide the input. Alternatively, a user may provide inputs with a display device having an accelerometer, e.g., a user may tilt a tablet device having an accelerometer such that an object displayed in the display of the tablet device moves in the direction of the tilt. As yet another alternative, a user may utilize an audio device to provide inputs. For example, volume or frequency may be attached to certain properties of an animated object. For instance, a user may scream harder to the device to make a character or car move faster. A user may also utilize a keyboard, human body motion tracking via a device camera or external camera, device compass, pen, multiple mouse cursors shared on a single screen via a server or peer-to-peer connection, or magnetometer. The input mechanisms provided for herein are examples. Input mechanisms are not limited to the examples provided for herein as a variety of input mechanisms may be utilized. Further, at a process block 304, the process 300 determines, at a physics animation rule engine, a physics generated movement of the object that results from a set of physics animation rules being applied to the inputted movement. In addition, at a process block 306, the process 300 displays, at the graphical user interface, the physics generated movement of the object in addition to the inputted movement of the object. At a process block 308, the process 300 also records, at the animation authoring component, the physics generated movement of the object in addition to the inputted movement of the object. Accordingly, the user is able to record an intuitive interaction with characters, objects, etc., which may then later be played back as an animation. The physics rule-based recording process of intuitive interactions is a simpler approach to that of performing numerous mathematical calculations to generate an animation.

FIGS. 4A-4D illustrates an example of a GUI 400 with physics animation of various objects. For example, FIG. 4A illustrates the GUI 400 with a ball 402, a pointer 404, a first elephant 406, and a second elephant 408. Further, FIG. 4B illustrates an example of the pointer 404, e.g., a mouse cursor, moving the ball 402 from the right side of the GUI 400 to the left side of the GUI 400. The pointer 404 may or may not be utilized depending on the type of input mechanism utilized as discussed with respect to FIG. 3. In addition, FIG. 4C illustrates an example of the pointer 404 illustrated in FIG. 4B releasing the ball 402. A recording of the movement of the ball 402 may be performed. In accordance with the physics rule of gravity, the ball 402 drops. After colliding with the second elephant 408, the ball 402 bounces up off of the second elephant 408 and falls to the ground in accordance with the physics rule of gravity. The ball 402 may periodically continue to bounce and then collide with the first elephant 406. The ball 402 then bounces off of the first elephant 406 and eventually stops. FIG. 4D illustrates an example in which the pointer 404 picks up the first elephant 406. Since the pointer 404 picks up the first elephant 406 at a point towards the back top portion of the first elephant 406, the first elephant 406 rotates forward when being picked up in accordance with physics rules. The point towards the top of the first elephant is a grab handle 410 as indicated by the dashed line. In another embodiment, a plurality of predetermined points on an object may be grab handles. In yet another embodiment, any point in the object may be grab handle.

In one embodiment, the user may customize the set of physics rules. In other words, the user may select certain physics rules to include and certain physics rules to exclude. For example, the user may include a gravitational physics rule, but may not include an inertia physics rule. In another embodiment, the user may, additionally or alternatively, customize one or more parameters for one or more of the physics rules. As an example, a user may customize the strength or weakness of various forces.

The physics rules are not limited the examples provided herein. For example, other physics rules such as density, friction, restitution, and collision detection may be utilized.

Further, other configurations than those illustrated that implement the physics rules may be utilized. For example, a display of a car driving up a ramp, jumping, and having a collision with another car may utilize the physics rules. As another example, an object with a fixed position such as a wheel may be spun according to the physics rules. As yet another example, a display of a swing may be provided in accordance with the physics rules. As another example, a display of a side view of a bowling game may be provided in accordance with the physics rules. The physics rules may also be applied to displays of more complex motions such as the wheels of a locomotive.

FIG. 5 illustrates a system configuration 500 that may be utilized physics rule animation. In one embodiment, the physics rule animation engine 206 interacts with a memory 506. In one embodiment, the system configuration 500 is suitable for storing and/or executing program code and is implemented using a general purpose computer or any other hardware equivalents. The processor 504 is coupled, either directly or indirectly, to the memory 506 through a system bus. The memory 506 can include local memory employed during actual execution of the program code, bulk storage, and/or cache memories which provide temporary storage of at least some program code in order to reduce the number of times code must be retrieved from bulk storage during execution.

The Input/Output ("I/O") devices 502 can be coupled directly to the system configuration 500 or through intervening input/output controllers. Further, the I/O devices 502 may include a keyboard, a keypad, a mouse, a microphone for capturing speech commands, a pointing device, and other user input devices that will be recognized by one of ordinary skill in the art. Further, the I/O devices 502 may include output devices such as a printer, display screen, or the like. Further, the I/O devices 502 may include a receiver, transmitter, speaker, display, image capture sensor, biometric sensor, etc. In addition, the I/O devices 502 may include storage devices such as a tape drive, floppy drive, hard disk drive, compact disk ("CD") drive, etc.

Network adapters may also be coupled to the system configuration 500 to enable the system configuration 500 to become coupled to other systems, remote printers, or storage devices through intervening private or public networks. Modems, cable modems, and Ethernet cards are just a few of the currently available types of network adapters.

FIG. 6 illustrates a pinball physics configuration in a GUI 600. The pinball physics configuration includes a first circle 602, a second circle 604, and a rectangle 606. These objects are considered physics objects. The physics objects may be created, positioned, and/or scaled by the user. The illustrated physics objects are illustrated as examples only as one or more various objects may be utilized as the physics objects. The shape of a physics object can be any form of object. A line 608 is drawn by a virtual brush. For example, the virtual brush may draw a vertical line, which then collides with the first circle 602, which leads to the line bouncing toward the second circle 604. After colliding with the second circle 604, the line bounces toward the rectangle 606. After colliding with the rectangle 606, the line bounces to the left and finally drops off the GUI. The path is drawn by the virtual brush. Further, the virtual brush may change parameters such as size, opacity, rotation, color, etc., based on the speed and/or direction of the virtual brush to create different effects.

Accordingly, the user may artistically draw in a pinball format. For example, the user may move the ball around with paint on that ball so that the ball paints on the virtual canvas. The physics objects may have different bounce values, which generate different paths for the virtual brush.

In yet another embodiment, the movement of the objects may be performed by movement of the device on which the GUI is displayed. For example, device sensor input such as an accelerometer in a smartphone or tablet may sense the motion that the user is making with the device. The physics rules may then be applied to the user's motions with respect to the device. For example, a visual depiction of a coin displayed on the GUI of a table device may slide off the GUI if the user rotates the tablet device.

Any of the configurations described herein may be utilized with various input methods other than device sensor input. The input methods may include mouse cursor input, touch input, multi-touch input, etc. With respect to multi-touch input, multiple objects may be moved at the same. Multiple users may also potentially move multiple objects at the same time with multi-touch input.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes, systems, and computer program products. Therefore, it is to be understood that, within the scope of the appended claims, the present processes, systems, and computer program products may be practiced other than as specifically described herein.

I claim:

1. A computer program product comprising one or more computer useable memories having a computer readable program, the computer readable program when executed on a computer causing the computer to:
   receive, at an animation authoring component, an inputted movement of an object displayed in a graphical user interface;
   determine, at a physics animation rule engine, a physics generated movement of the object that results from a set of physics animation rules being applied to the inputted movement;
   display, at the graphical user interface, the physics generated movement of the object in addition to the inputted movement of the object, at least one visual display parameter of the physics generated movement being changed during display based at least in part on speed of the inputted movement of the object, the changed visual display parameter causing a change in visual appearance of the object according to the speed; and
   record, at the animation authoring component, the physics generated movement of the object in addition to the inputted movement of the object.

2. The computer program product of claim 1, wherein the computer readable program when executed on the computer is further caused to display, at a runtime component, an animation that includes the physics generated movement of the object in addition to the inputted movement of the object.

3. The computer program product of claim 1, wherein the set of physics animation rules is selected from the group consisting of a gravitation rule, a centripetal force rule, a centrifugal force rule, and an inertia rule.

4. The computer program product of claim 1, wherein the set of physics rules is customized to include a first group of physics rules and exclude a second group of physics rules.

5. The computer program product of claim 1, wherein one or more parameters of one or more physics rules in the set of physics rules are customized.

6. The computer program product of claim 1, wherein the graphical user interface is a component of a multi-touch enabled device.

7. The computer program product of claim 1, wherein a plurality of pixels in the object each have a corresponding grab handle.

8. The computer program product of claim 7, wherein the inputted movement is performed over one of the plurality of pixels such that the corresponding grab handle and the object are moved in accordance with the set of physics animation rules.

9. A method comprising:
 receiving, at an animation authoring component, an inputted movement of an object displayed in a graphical user interface;
 determining, at a physics animation rule engine, a physics generated movement of the object that results from a set of physics animation rules being applied to the inputted movement;
 display, at the graphical user interface, the physics generated movement of the object in addition to the inputted movement of the object, at least one visual display parameter of the physics generated movement being changed during display based at least in part on one of direction or speed of the inputted movement of the object, the changed visual display parameter being a size, an opacity, a rotation, or a color of the physics generated movement; and
 recording, at the animation authoring component, the physics generated movement of the object in addition to the inputted movement of the object.

10. The method of claim 9, further comprising displaying, at a runtime component, an animation that includes the physics generated movement of the object in addition to the inputted movement of the object.

11. The method of claim 9, wherein the set of physics animation rules is selected from the group consisting of a gravitation rule, a centripetal force rule, a centrifugal force rule, and an inertia rule.

12. The method of claim 9, wherein the set of physics rules is customized to include a first group of physics rules and exclude a second group of physics rules.

13. The method of claim 9, wherein one or more parameters of one or more physics rules in the set of physics rules are customized.

14. The method of claim 9, wherein the graphical user interface is a component of a multi-touch enabled device.

15. The method of claim 9, wherein a plurality of pixels in the object each have a corresponding grab handle.

16. The method of claim 15, wherein the inputted movement is performed over one of the plurality of pixels such that the corresponding grab handle and the object are moved in accordance with the set of physics animation rules.

17. A system comprising:
 an animation authoring component that receives an inputted movement of an object and records the inputted movement of the object in addition to a physics generated movement of the object, the inputted movement based at least in part on an audio input;
 a physics animation rule engine that determines the physics generated movement of the object that results from the set of physics animation rules being applied to the inputted movement, the determining including attaching a property of the audio input to a property of the physics generated movement; and
 a graphical user interface that displays the physics generated movement of the object in addition to the inputted movement of the object, at least one parameter of the physics generated movement being changed during display based at least in part on one of direction or speed of the inputted movement of the object.

18. The system of claim 17, wherein the system further comprises a runtime component that displays an animation that includes the physics generated movement of the object in addition to the inputted movement of the object.

19. The system of claim 17, wherein a plurality of pixels in the object each have a corresponding grab handle.

20. The system of claim 19, wherein the inputted movement is performed over one of the plurality of pixels such that the corresponding grab handle and the object are moved in accordance with the set of physics animation rules.

* * * * *